US008125389B1

(12) United States Patent
Opshaug et al.

(10) Patent No.: US 8,125,389 B1
(45) Date of Patent: Feb. 28, 2012

(54) DOPPLER-AIDED POSITIONING, NAVIGATION, AND TIMING USING BROADCAST TELEVISION SIGNALS

(75) Inventors: Guttorm Opshaug, Redwood City, CA (US); Ju-Yong Do, Palo Alto, CA (US); Dimitri Rubin, Cupertino, CA (US)

(73) Assignee: TruePosition, Inc., Berwyn, PA (US)

( * ) Notice: Subject to any disclaimer, the term of this patent is extended or adjusted under 35 U.S.C. 154(b) by 250 days.

(21) Appl. No.: 12/582,051

(22) Filed: Oct. 20, 2009

Related U.S. Application Data (60) Provisional application No. 61/106,849, filed on Oct. 20, 2008.

(51) Int. Cl.
*G01S 3/02* (2006.01)
(52) U.S. Cl. .................................... 342/458; 342/464
(58) Field of Classification Search .................. 342/458, 342/464, 387
See application file for complete search history.

(56) References Cited

U.S. PATENT DOCUMENTS

| | | | |
|---|---|---|---|
| 4,555,707 A | 11/1985 | Connelly | |
| 4,652,884 A | 3/1987 | Starker | |
| 4,700,306 A | 10/1987 | Wallmander | |
| 4,894,662 A | 1/1990 | Counselman | |
| 5,045,861 A | 9/1991 | Duffett-Smith | |
| 5,157,686 A | 10/1992 | Omura et al. | |
| 5,166,952 A | 11/1992 | Omura et al. | |
| 5,271,034 A | 12/1993 | Abaunza | |
| 5,323,322 A | 6/1994 | Mueller et al. | |
| 5,398,034 A | 3/1995 | Spilker, Jr. | |
| 5,481,316 A | 1/1996 | Patel | |
| 5,504,492 A | 4/1996 | Class et al. | |
| 5,510,801 A * | 4/1996 | Engelbrecht et al. | 342/457 |
| 5,604,765 A | 2/1997 | Bruno et al. | |
| 5,630,206 A | 5/1997 | Urban et al. | |
| 5,648,982 A | 7/1997 | Durrant et al. | |
| 5,774,829 A | 6/1998 | Cisneros et al. | |
| 5,784,339 A | 7/1998 | Woodsum et al. | |
| 5,835,060 A | 11/1998 | Czarnecki et al. | |

(Continued)

FOREIGN PATENT DOCUMENTS

DE    3242997 A1    5/1984

(Continued)

OTHER PUBLICATIONS

He et al, "Positioning Models and Systems Based on Digital Television Broadcasting Signals," Front. Electr. Electron. Eng. China, 2007, pp. 410-414.*

(Continued)

*Primary Examiner* — Gregory C Issing
(74) *Attorney, Agent, or Firm* — Woodcock Washburn LLP (57) ABSTRACT

Methods having corresponding apparatus and tangible computer-readable media comprise: determining a plurality of first pseudoranges based on a plurality of respective wireless television signals received by an apparatus and a clock signal generated by the apparatus, wherein each of the first pseudoranges represent a difference between a time of transmission of the respective wireless television signal from a respective transmitter and a time of reception of the respective wireless television signal at the apparatus and a time offset of the clock signal; determining a plurality of first estimates of frequency offsets of the wireless television signals received by the apparatus; and determining a first estimate of a location of the apparatus based on the first pseudoranges, the first frequency offsets of the wireless television signals, and locations of the transmitters.

18 Claims, 2 Drawing Sheets

U.S. PATENT DOCUMENTS

| | | |
|---|---|---|
| 5,920,284 A | 7/1999 | Victor |
| 5,952,958 A | 9/1999 | Speasl et al. |
| 5,953,311 A | 9/1999 | Davies et al. |
| 6,006,097 A | 12/1999 | Hornfeldt et al. |
| 6,016,119 A | 1/2000 | Krasner |
| 6,078,284 A | 6/2000 | Levanon |
| 6,094,168 A | 7/2000 | Duffett-Smith et al. |
| 6,107,959 A | 8/2000 | Levanon |
| 6,137,441 A | 10/2000 | Dai et al. |
| 6,144,413 A | 11/2000 | Zatsman |
| 6,147,642 A | 11/2000 | Perry et al. |
| 6,181,921 B1 | 1/2001 | Konisi et al. |
| 6,184,921 B1 | 2/2001 | Limberg |
| 6,201,497 B1 | 3/2001 | Snyder et al. |
| 6,215,778 B1 | 4/2001 | Lomp et al. |
| 6,289,280 B1 | 9/2001 | Fernandez-Corbaton et al. |
| 6,317,452 B1 | 11/2001 | Durrant et al. |
| 6,317,500 B1 | 11/2001 | Murphy |
| 6,373,432 B1 | 4/2002 | Rabinowitz et al. |
| 6,374,177 B1 | 4/2002 | Lee et al. |
| 6,400,753 B1 | 6/2002 | Kohli et al. |
| 6,433,740 B1 | 8/2002 | Gilhousen |
| 6,437,832 B1 | 8/2002 | Grabb et al. |
| 6,484,034 B1 | 11/2002 | Tsunehara et al. |
| 6,522,297 B1 | 2/2003 | Rabinowitz et al. |
| 6,559,800 B2 | 5/2003 | Rabinowitz et al. |
| 6,559,894 B2 | 5/2003 | Omura et al. |
| 6,590,529 B2 | 7/2003 | Schwoegler |
| 6,646,603 B2 | 11/2003 | Dooley et al. |
| 6,717,547 B2 | 4/2004 | Spilker, Jr. et al. |
| 6,727,847 B2 | 4/2004 | Rabinowitz et al. |
| 6,753,812 B2 | 6/2004 | Rabinowitz et al. |
| 6,806,830 B2 | 10/2004 | Panasik et al. |
| 6,839,024 B2 | 1/2005 | Spilker, Jr. et al. |
| 6,859,173 B2 | 2/2005 | Spilker, Jr. et al. |
| 6,861,984 B2 | 3/2005 | Rabinowitz et al. |
| 6,879,286 B2 | 4/2005 | Rabinowitz et al. |
| 6,914,560 B2 | 7/2005 | Spilker, Jr. et al. |
| 6,917,328 B2 | 7/2005 | Rabinowitz et al. |
| 6,937,866 B2 | 8/2005 | Duffett-Smith et al. |
| 6,952,182 B2 * | 10/2005 | Spilker et al. ............... 342/464 |
| 6,961,020 B2 | 11/2005 | Robinowitz et al. |
| 6,963,306 B2 | 11/2005 | Spilker, Jr. et al. |
| 6,970,132 B2 | 11/2005 | Spilker, Jr. et al. |
| 7,042,396 B2 | 5/2006 | Omura et al. |
| 7,042,949 B1 | 5/2006 | Omura et al. |
| 7,126,536 B2 | 10/2006 | Rabinowitz et al. |
| 7,260,378 B2 | 8/2007 | Holland et al. |
| 7,269,424 B2 | 9/2007 | Camp, Jr. |
| 7,372,405 B2 | 5/2008 | Rabinowitz et al. |
| 7,463,195 B2 | 12/2008 | Rabinowitz et al. |
| 7,466,266 B2 | 12/2008 | Opshaug |
| 7,471,244 B2 | 12/2008 | Omura et al. |
| 2002/0122003 A1 | 9/2002 | Patwari et al. |
| 2002/0168988 A1 | 11/2002 | Younis |
| 2002/0184653 A1 | 12/2002 | Pierce et al. |
| 2003/0162547 A1 | 8/2003 | McNair |
| 2004/0073914 A1 | 4/2004 | Spilker, Jr. |
| 2004/0201779 A1 | 10/2004 | Spilker, Jr. |
| 2005/0066373 A1 | 3/2005 | Rabinowitz et al. |
| 2005/0251844 A1 | 11/2005 | Martone et al. |
| 2006/0116820 A1 * | 6/2006 | Mori et al. ............... 701/213 |
| 2007/0050824 A1 | 3/2007 | Lee et al. |
| 2007/0121555 A1 | 5/2007 | Burgess |
| 2007/0131079 A1 | 6/2007 | Opshaug et al. |
| 2009/0070847 A1 | 3/2009 | Furman et al. |
| 2009/0175379 A1 | 7/2009 | Rubin et al. |

FOREIGN PATENT DOCUMENTS

| | | |
|---|---|---|
| EP | 58129277 | 8/1983 |
| GB | 2 222 922 A | 3/1990 |
| GB | 2 254 508 A | 10/1992 |

OTHER PUBLICATIONS

U.S. Appl. No. 10/008,613, Pierce, et al.
U.S. Appl. No. 11/380,691, Metzler, et al.
U.S. Appl. No. 11/535,485, Furman, et al.
U.S. Appl. No. 11/622,838, Rabinowitz, et al.
U.S. Appl. No. 11/770,162, Furman, et al.
U.S. Appl. No. 11/865,881, Opshaug, et al.
U.S. Appl. No. 12/117,676, Rabinowitz et al.
U.S. Appl. No. 12/209,971, Do, et al.
U.S. Appl. No. 12/263,731, Rabinowitz et al.
U.S. Appl. No. 12/351,841, Lee, et al.
U.S. Appl. No. 12/476,992, Do, et al.
U.S. Appl. No. 12/578,456, Opshaug, et al.
Parkinson, B.W., et al., "Autonomous GPS Integrity Monitoring Using the Pseudorange Residual," *Journal of the Institute of Navigation* (1988), vol. 35, No. 2, pp. 255-274.
Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59-73.
Spilker, Jr., J.J., "Fundamentals of Signal Tracking Theory," *Global Positioning System: Theory and Applications* (1994), vol. 1, Chapter 7, pp. 245-327.
Van Dierendock, A.J., "GPS Receivers," *Global Positioning System: Theory and Applications* (1995), vol. 1, Chapter 8, pp. 329-407.
Li, X., et al., "Indoor Geolocation Using OFDM Signals in HIPERLAN/2 Wireless LANS," $11^{th}$ IEEE International Symposium on Personal Indoor and Mobile Radio Communications, PIMRC 2000, Proceedings (Cat. No. 00TH8525), Proceedings of $11^{th}$ International Symposium on Personal Indoor and Mobile Radio Communication, London, UK, Sep. 18-21, pp. 1449-1453, vol. 2, XPO10520871, 2000, Piscataway, NJ, USA, IEEE, USA, ISBN; 9-7803-6463-5, Chapter I and III.
Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.

* cited by examiner

DOPPLER-AIDED POSITIONING, NAVIGATION, AND TIMING USING BROADCAST TELEVISION SIGNALS

CROSS-REFERENCE TO RELATED APPLICATIONS

This application claims benefit of U.S. Provisional Patent Application Ser. No. 61/106,849 filed Oct. 20, 2008, the disclosure thereof incorporated by reference herein in its entirety.

FIELD

The present disclosure relates generally to navigation using wireless signals. More particularly, the present disclosure relates to Doppler-aided positioning, navigation, and timing using broadcast television signals.

BACKGROUND

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. But because the GPS signals are transmitted at relatively low power levels (less than 100 watts) and over great distances, the received signal strength is relatively weak (on the order of −160 dBw as received by an omni-directional antenna). Thus the GPS signal is marginally useful or not useful at all in the presence of blockage or inside a building.

As an alternative or supplement to GPS, broadcast television signals can be used to determine the position of a user device. Techniques for determining the position of a user device using the American Television Standards Committee (ATSC) digital television (DTV) signal are disclosed in U.S. Pat. No. 6,861,984, "Position Location using Broadcast Digital Television Signals," the disclosure thereof incorporated by reference herein in its entirety. Techniques for determining the position of a user device using the European Telecommunications Standards Institute (ETSI) Digital Video Broadcasting (DVB) signal are disclosed in U.S. Non-provisional U.S. Pat. No. 7,126,536, "Wireless Position Location Using the Japanese ISDB-T Digital TV Signals," the disclosure thereof incorporated by reference herein in its entirety. Techniques for determining the position of a user device using the Japanese Integrated Services Digital Broadcasting-Terrestrial (ISDB-T) signal are disclosed in U.S. Pat. No. 6,952,182, "Position Location using Terrestrial Digital Video Broadcast Television Signals," the disclosure thereof incorporated by reference herein in its entirety. Techniques for determining the position of a user device using the NTSC (National Television System Committee) analog television (TV) signal are disclosed in U.S. Pat. No. 6,559,800 and U.S. Pat. No. 6,522,297, the disclosures thereof incorporated by reference herein in their entirety.

Each of these television signals includes components that can be used to obtain a pseudo-range to the transmitter of the television signal. When multiple such pseudo-ranges are known, and the locations of the transmitters are known, the position of the user device can be determined with accuracy. Suitable components within the ATSC digital television signal include synchronization codes such as the Field Synchronization Segment within an ATSC data frame and the Synchronization Segment within a Data Segment within an ATSC data frame. Suitable components within the ETSI DVB and ISDB-T digital television signals include scattered pilot carriers. Suitable components within the NTSC analog television signal include the horizontal synchronization pulse, the horizontal blanking pulse, the horizontal blanking pulse and horizontal synchronization pulse taken together, the ghost canceling reference signal, the vertical interval test signal, and other chirp-type signals.

One approach to providing additional navigation information concerns the use of Doppler measurements of wireless signals. When a user is moving, due to the Doppler effect, the observed frequency of a wireless signal shifts in proportion to the user velocity, which can be converted to a position relative to a known starting point. This concept of Doppler positioning is well known and has been tried in Transit, one of the earliest satellite navigation systems. However, because satellites are moving very fast (4 km/s for GPS satellites), and are more sensitive to user vertical movement, it is rather hard to detect user horizontal motion—the primary concern of pedestrian positioning—from the Doppler shift measured from satellite signals.

SUMMARY

In general, in one aspect, an embodiment features an apparatus comprising: a clock module configured to generate a clock signal; a pseudorange measurement module configured to determine a plurality of first pseudoranges based on the clock signal and a plurality of respective wireless television signals received by an apparatus, wherein each of the first pseudoranges represents a difference between a time of transmission of the respective wireless television signal from a respective transmitter and a time of reception of the respective wireless television signal at the apparatus and a time offset of the clock signal; a frequency offset measurement module configured to determine a plurality of first estimates of frequency offsets of the wireless television signals received by the apparatus based on the clock signal; and an estimation module configured to determine a first estimate of a location of the apparatus based on the first pseudoranges, the first frequency offsets of the wireless television signals, and locations of the transmitters.

Embodiments of the apparatus can include one or more of the following features. Some embodiments comprise a receiver module configured to receive indications of times of transmission of the wireless television signals and measurements of the frequencies of the wireless television signals, wherein the measurements of the frequencies of the wireless television signals are determined at one or more monitor units receiving the wireless television signals at known locations; wherein the pseudorange measurement module is further configured to determine the plurality of first pseudoranges based on the clock signal, the plurality of respective wireless television signals received by the apparatus, and the times of transmission of the wireless television signals; and wherein the frequency offset measurement module is further configured to determine the plurality of first estimates of the frequency offsets of the wireless television signals received by the apparatus based on the clock signal and the measurements of the frequencies of the wireless television signals. In some embodiments, the estimation module comprises: a pseudorange processing module configured to determine a first interim estimate of the location of the apparatus, and a first interim estimate of the time offset of the clock signal, based on the first pseudoranges; a Doppler processing module configured to determine a first interim estimate of the velocity of the apparatus, and a first interim estimate of the frequency offset of the clock signal, based on the first estimates of the frequency offsets of the wireless television signals. In some embodiments, the estimation module further comprises: a hybrid module configured to determine the first estimate of the location of the apparatus based on the first interim estimate of the location of the apparatus, the first interim estimate of the time offset of the clock signal, the first interim estimate of the velocity of the apparatus, and the first interim estimate of the frequency offset of the clock signal. In some embodiments, the hybrid module is further configured to determine a first estimate of the time offset of the clock signal, a first estimate of the velocity of the apparatus, and a first estimate of a frequency offset of the clock signal based on the first interim estimate of the location of the apparatus, the first interim estimate of the time offset of the clock signal, the first interim estimate of the velocity of the apparatus, and the first interim estimate of the frequency offset of the clock signal. In some embodiments, the pseudorange measurement module is further configured to determine a plurality of second pseudoranges based on the wireless television signals received by the apparatus; the frequency offset measurement module is further configured to determine a plurality of second estimates of the frequency offsets of the wireless television signals received by the apparatus; and the estimation module is further configured to determine a second estimate of the location of the apparatus based on the second pseudoranges, the second estimates of the frequency offsets of the wireless television signals, the locations of the transmitters, the first estimate of the location of the apparatus, the first estimate of the time offset of the clock signal, the first estimate of the velocity of the apparatus, and the first estimate of the frequency offset of the clock signal. In some embodiments, the pseudorange processing module is further configured to determine a second interim estimate of the location of the apparatus, and a second interim estimate of the time offset of the clock signal, based on the second pseudoranges, the second estimates of the frequency offsets of the wireless television signals, the locations of the transmitters, the first estimate of the location of the apparatus, the first estimate of the time offset of the clock signal, the first estimate of the velocity of the apparatus, and the first estimate of the frequency offset of the clock signal; and the Doppler processing module is further configured to determine a second interim estimate of the velocity of the apparatus, and a second interim estimate of the frequency offset of the clock signal, based on the second pseudoranges, the second estimates of the frequency offsets of the wireless television signals, the locations of the transmitters, the first estimate of the location of the apparatus, the first estimate of the time offset of the clock signal, the first estimate of the velocity of the apparatus, and the first estimate of the frequency offset of the clock signal. Some embodiments comprise wherein the hybrid module is further configured to determine the second estimate of the location of the apparatus based on the second interim estimate of the location of the apparatus, the second interim estimate of the time offset of the clock signal, the second interim estimate of the velocity of the apparatus, and the second interim estimate of the frequency offset of the clock signal.

In general, in one aspect, an embodiment features a method comprising: determining a plurality of first pseudoranges based on a plurality of respective wireless television signals received by an apparatus and a clock signal generated by the apparatus, wherein each of the first pseudoranges represent a difference between a time of transmission of the respective wireless television signal from a respective transmitter and a time of reception of the respective wireless television signal at the apparatus and a time offset of the clock signal; determining a plurality of first estimates of frequency offsets of the wireless television signals received by the apparatus; and determining a first estimate of a location of the apparatus based on the first pseudoranges, the first frequency offsets of the wireless television signals, and locations of the transmitters.

Embodiments of the method can include one or more of the following features. Some embodiments comprise receiving indications of times of transmission of the wireless television signals; receiving measurements of frequencies of the wireless television signals, wherein the measurements of the frequencies of the wireless television signals are determined at one or more monitor units receiving the wireless television signals at known locations; determining the plurality of first pseudoranges based on the clock signal, the plurality of respective wireless television signals received by the apparatus, and the times of transmission of the wireless television signals; and determining the plurality of first estimates of the frequency offsets of the wireless television signals received by the apparatus based on the clock signal and the measurements of the frequencies of the wireless television signals. Some embodiments comprise determining a first interim estimate of the location of the apparatus based on the first pseudorange; determining a first interim estimate of the time offset of the clock signal based on the first pseudorange; determining a first interim estimate of the velocity of the apparatus based on the first estimate of the frequency offset of the wireless television signal; and determining a first interim estimate of the frequency offset of the clock signal based on the first estimate of the frequency offset of the wireless television signal. Some embodiments comprise determining the first estimate of the location of the apparatus based on the first interim estimate of the location of the apparatus, the first interim estimate of the time offset of the clock signal, the first interim estimate of the velocity of the apparatus, and the first interim estimate of the frequency offset of the clock signal. Some embodiments comprise determining a first estimate of the time offset of the clock signal, a first estimate of the velocity of the apparatus, and a first estimate of a frequency offset of the clock signal based on the first interim estimate of the location of the apparatus, the first interim estimate of the time offset of the clock signal, the first interim estimate of the velocity of the apparatus, and the first interim estimate of the frequency offset of the clock signal. Some embodiments comprise determining a plurality of second pseudoranges based on the wireless television signals received by the apparatus; determining a plurality of second estimates of the frequency offsets of the wireless television signals received by the apparatus; and determining a second estimate of the location of the apparatus based on the second pseudoranges, the second estimates of the frequency offsets of the wireless television signals, the locations of the transmitters, the first estimate of the location of the apparatus, the first estimate of the time offset of the clock signal, the first estimate of the velocity of the apparatus, and the first estimate of the frequency offset of the clock signal. Some embodiments comprise determining a second interim estimate of the location of the apparatus, a second interim estimate of the time offset of the clock signal, a second interim estimate of a velocity of the apparatus, and a second interim estimate of the frequency offset of the clock signal based on the second pseudorange, the second estimate of the frequency offset of the wireless television signal, the location of the transmitter, the first estimate of the location of the apparatus, the first estimate of the time offset of the clock signal, the first estimate of the velocity of the apparatus, and the first estimate of the frequency offset of the clock signal. Some embodiments comprise determining the second estimate of the location of the apparatus based on the second interim estimate of the location of the apparatus, the second interim estimate of the time offset of the clock signal, the second interim estimate of the velocity of the apparatus, and the second interim estimate of the frequency offset of the clock signal.

In general, in one aspect, an embodiment features tangible computer-readable media embodying instructions executable by a computer to perform a method comprising: determining a plurality of first pseudoranges based on a plurality of respective wireless television signals received by an apparatus and a clock signal generated by the apparatus, wherein each of the first pseudoranges represent a difference between a time of transmission of the respective wireless television signal from a respective transmitter and a time of reception of the respective wireless television signal at the apparatus and a time offset of the clock signal; determining a plurality of first estimates of frequency offsets of the wireless television signals received by the apparatus; and determining a first estimate of a location of the apparatus based on the first pseudoranges, the first frequency offsets of the wireless television signals, and locations of the transmitters.

Embodiments of the tangible computer-readable media can include one or more of the following features. In some embodiments, the method further comprises: receiving indications of times of transmission of the wireless television signals; receiving measurements of frequencies of the wireless television signals, wherein the measurements of the frequencies of the wireless television signals are determined at one or more monitor units receiving the wireless television signals at known locations; determining the plurality of first pseudoranges based on the clock signal, the plurality of respective wireless television signals received by the apparatus, and the times of transmission of the wireless television signals; and determining the plurality of first estimates of the frequency offsets of the wireless television signals received by the apparatus based on the clock signal and the measurements of the frequencies of the wireless television signals. In some embodiments, the method further comprises: determining a first interim estimate of the location of the apparatus based on the first pseudorange; determining a first interim estimate of the time offset of the clock signal based on the first pseudorange; determining a first interim estimate of the velocity of the apparatus based on the first estimate of the frequency offset of the wireless television signal; and determining a first interim estimate of the frequency offset of the clock signal based on the first estimate of the frequency offset of the wireless television signal. In some embodiments, the method further comprises: determining the first estimate of the location of the apparatus based on the first interim estimate of the location of the apparatus, the first interim estimate of the time offset of the clock signal, the first interim estimate of the velocity of the apparatus, and the first interim estimate of the frequency offset of the clock signal. In some embodiments, the method further comprises: determining a first estimate of the time offset of the clock signal, a first estimate of the velocity of the apparatus, and a first estimate of a frequency offset of the clock signal based on the first interim estimate of the location of the apparatus, the first interim estimate of the time offset of the clock signal, the first interim estimate of the velocity of the apparatus, and the first interim estimate of the frequency offset of the clock signal. In some embodiments, the method further comprises: determining a plurality of second pseudoranges based on the wireless television signals received by the apparatus; determining a plurality of second estimates of the frequency offsets of the wireless television signals received by the apparatus; and determining a second estimate of the location of the apparatus based on the second pseudoranges, the second estimates of the frequency offsets of the wireless television signals, the locations of the transmitters, the first estimate of the location of the apparatus, the first estimate of the time offset of the clock signal, the first estimate of the velocity of the apparatus, and the first estimate of the frequency offset of the clock signal. In some embodiments, the method further comprises: determining a second interim estimate of the location of the apparatus, a second interim estimate of the time offset of the clock signal, a second interim estimate of a velocity of the apparatus, and a second interim estimate of the frequency offset of the clock signal based on the second pseudorange, the second estimate of the frequency offset of the wireless television signal, the location of the transmitter, the first estimate of the location of the apparatus, the first estimate of the time offset of the clock signal, the first estimate of the velocity of the apparatus, and the first estimate of the frequency offset of the clock signal. In some embodiments, the method further comprises: determining the second estimate of the location of the apparatus based on the second interim estimate of the location of the apparatus, the second interim estimate of the time offset of the clock signal, the second interim estimate of the velocity of the apparatus, and the second interim estimate of the frequency offset of the clock signal.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present disclosure provide elements of a system that enables navigation using television signals. In particular, wireless television signals received by a user device are used to provide information regarding the position and velocity of the user device, as well as information regarding time and frequency. This information can also be used for purposes other than navigation. For example, the provided information can be used in the operation of femtocells, for example as described in U.S. patent application Ser. No. 12/476,992 filed Jun. 2, 2009, the disclosure thereof incorporated by reference herein in its entirety.

In various embodiments, pseudorange measurements of wireless television signals are used to provide range and time information to a user device. In addition, Doppler measurements of the wireless television signals are used to provide velocity and frequency information. In contrast to satellites, television towers are stationary and horizontally distributed. Thus, Doppler shifts are almost entirely due to user horizontal movement. This fact makes Doppler positioning more suitable to television positioning than to GPS positioning. This navigation information (range, time, velocity, and frequency) is combined and used recursively with subsequent measurements to increase the accuracy of the navigation information.

Doppler effect is a phenomenon of an effective frequency shift of a waveform due to relative movement of the origin and target of the waveform. For example, the frequency f of a received waveform increases as the relative distance between the transmitter receiver decreases, as shown in equation (1)

$$f = f_0 \frac{c - \upsilon_{RX}}{c - \upsilon_{TX}} \quad (1)$$

where $f_0$ is the frequency of the waveform as transmitted, c is the speed of waveform, in this case the speed of light, and $\upsilon_{RX}$ and $\upsilon_{TX}$ are the velocities of the receiver and transmitter in a direction from the transmitter to the receiver. Because television transmitters are stationary, transmitter velocity $\upsilon_{TX}$ can be removed from equation (1), and the receiver velocity estimate $\hat{\upsilon}$ can be calculated as shown in equation (2)

$$\hat{\upsilon} = c \cdot \phi \quad (2)$$

where $\phi$ is a fractional pilot frequency offset (FPFO) measurement by a receiver of the waveform.

FPFO $\phi$ measured at the receiver is based on pilot frequency measurements made at the receiver and a monitor unit, $f_{user}$ and $f_{mon}$, respectively. A monitor unit is a stationary receiver at a known location (thus eliminating the Doppler effect) and is expected to have an insignificant measurement error, $\epsilon_{mon}$, compared to a user receiver measurement error, $\epsilon_{user}$. Pilot frequency measurements $f_{user}$ and $f_{mon}$ are given by equations (3) and (4), respectively $$f_{mon} = f_0 + \epsilon_{mon} \approx f_0 \quad (3)$$

$$f_{user} = f_0(1 - \upsilon/c) + \eta f_0 + \epsilon_{user} \quad (4)$$

where $$\eta = \frac{f_{LO,nom} - f_{LO}}{f_{LO,nom}} \quad (5)$$

is a fractional local oscillator offset (FLOO). $f_{LO}$ is a local oscillator frequency and $f_{LO,nom}$ is the nominal value. For simplification, it is assumed that $\epsilon_{mon} \approx 0$. Based on these measurements FPFO $\phi$ can be expressed as shown in equation (6).

$$\phi = 1 - f_{user}/f_{mon} \quad (6)$$

$$= 1 - \frac{f_0(1 - \upsilon/c + \eta) + \epsilon_{user}}{f_{mon}}$$

$$\approx 1 - \left(1 - \frac{\upsilon}{c} + \eta + \frac{\epsilon_{user}}{f_{mon}}\right)$$

$$= \frac{\upsilon}{c} - \eta - \frac{\epsilon_{user}}{f_{mon}}$$

Equation (6) is based on one-dimensional space where the velocity $\upsilon$ is expressed in a scalar format. Expanded into a three-dimensional space, velocity $\upsilon$ can be expressed in a vector format, as shown in equation (7).

$$\upsilon = (\upsilon_x, \upsilon_y, \upsilon_z) \quad (7)$$

FPFO $\phi$ consists of user velocity vector $\upsilon$, FLOO $\eta$, and a measurement error given by equation (8).

$$\epsilon_i^\phi = -\frac{\epsilon_{user,i}}{f_{mom}} \quad (8)$$

For a measurement from an ith transmitter, $$\phi_i = \frac{\upsilon \cdot e_i}{c} - \eta + \epsilon_i^\phi \quad (9)$$

where $$e_i = (\hat{u} - s_i)/\|\hat{u} - s_i\| \quad (10)$$

is a directional unit vector from the ith transmitter at a location $$s_i = (s_{x,i}, s_{y,i}, s_{z,i}) \quad (11)$$

to a user location $$u = (u_x, u_y, u_z) \quad (12)$$

For multiple FPFO measurements, the equation becomes $$\phi = Gy + \epsilon_\phi \quad (13)$$

where $\phi$ is an n×1 vector of FPFO measurements, $$y = \left(\frac{\upsilon_x}{c}, \frac{\upsilon_y}{c}, \frac{\upsilon_z}{c}, -\eta\right) \quad (14)$$

and $\epsilon_\phi$ is an n×1 measurement error vector. The number of measurements is given by n and G is an n×4 geometry matrix such that $$G = \begin{bmatrix} e_1^T & 1 \\ \vdots & \vdots \\ e_n^T & 1 \end{bmatrix} \quad (15)$$

Finally, the user variables $$y = \left(\frac{\upsilon}{c}, -\eta\right) \quad (16)$$

are estimated based on FPFO measurements $$\hat{y} = G^\dagger \phi \quad (17)$$

where $G^\dagger$ is the pseudo-inverse of the geometry matrix G. Since relative position is an accumulation of velocity, the user position $\hat{u}(t)$ can be estimated by integration of the estimate velocity $\hat{\upsilon}(\tau)$ with respect to the initial user position u(0), as shown in equation (18).

$$\hat{u}(t) = u(0) + \int_0^t \hat{v}(\tau)d\tau \quad (18)$$

According to various embodiments, Doppler positioning and timing based on FPFO measurements is combined with pseudorange-based positioning and timing based on pseudorange measurements. The measurements and variables used are shown in Table 1.

TABLE 1

| Positioning | Measurements | Variables |
|---|---|---|
| Doppler | Doppler frequency shift ($\phi$) | velocity (v) frequency offset ($\eta$) |
| Pseudoranging | pseudorange ($\rho$) | position (u) time offset (b) |

Referring to Table 1, FPFO measurements relate to velocity and frequency offset, while range measurements relate to position and time offset, with respective outputs of velocity and position. In pseudorange-based position and timing estimation, the user variables $$x = (u_x, u_y, u_z) \quad (19)$$

consist of user position u and a user receiver clock time offset b, are estimated from pseudorange measurements $\rho$, through iterations. This position estimation can be converted to velocity estimation $$\rho \rightarrow \hat{u} \rightarrow \hat{v} \quad (20)$$

while Doppler positioning estimates velocity first and derives position later $$\phi \rightarrow \hat{v} \rightarrow \hat{u} \quad (21)$$

Pseudorange-based positioning and timing provides an absolute position estimate while Doppler positioning generates a relative position estimate with respect to an initial location.

In order to take advantage of these two positioning and timing methods, a hybrid approach is used. Because these methods use two sets of measurements for position and time estimation, a hybrid solution taking both solutions together provides more reliable and accurate results. For example, these two sets of measurements can be combined by a common estimator. One example implementation uses a Kalman filter taking position estimates from pseudorange-based positioning and velocity estimates from Doppler positioning to generate more refined estimates. Furthermore, tight integration is possible as has been done in the integration of GPS and inertial sensors (INS), which many GPS manufacturers adopt to improve the reliability of GPS. These position or velocity estimates can be fed back to individual positioning engines to improve their sensitivity by reducing search windows. In contrast to the GPS INS integration, the hybrid TV pseudorange and Doppler positioning does not need additional hardware because they use different measurements from the same hardware.

Figure 1:
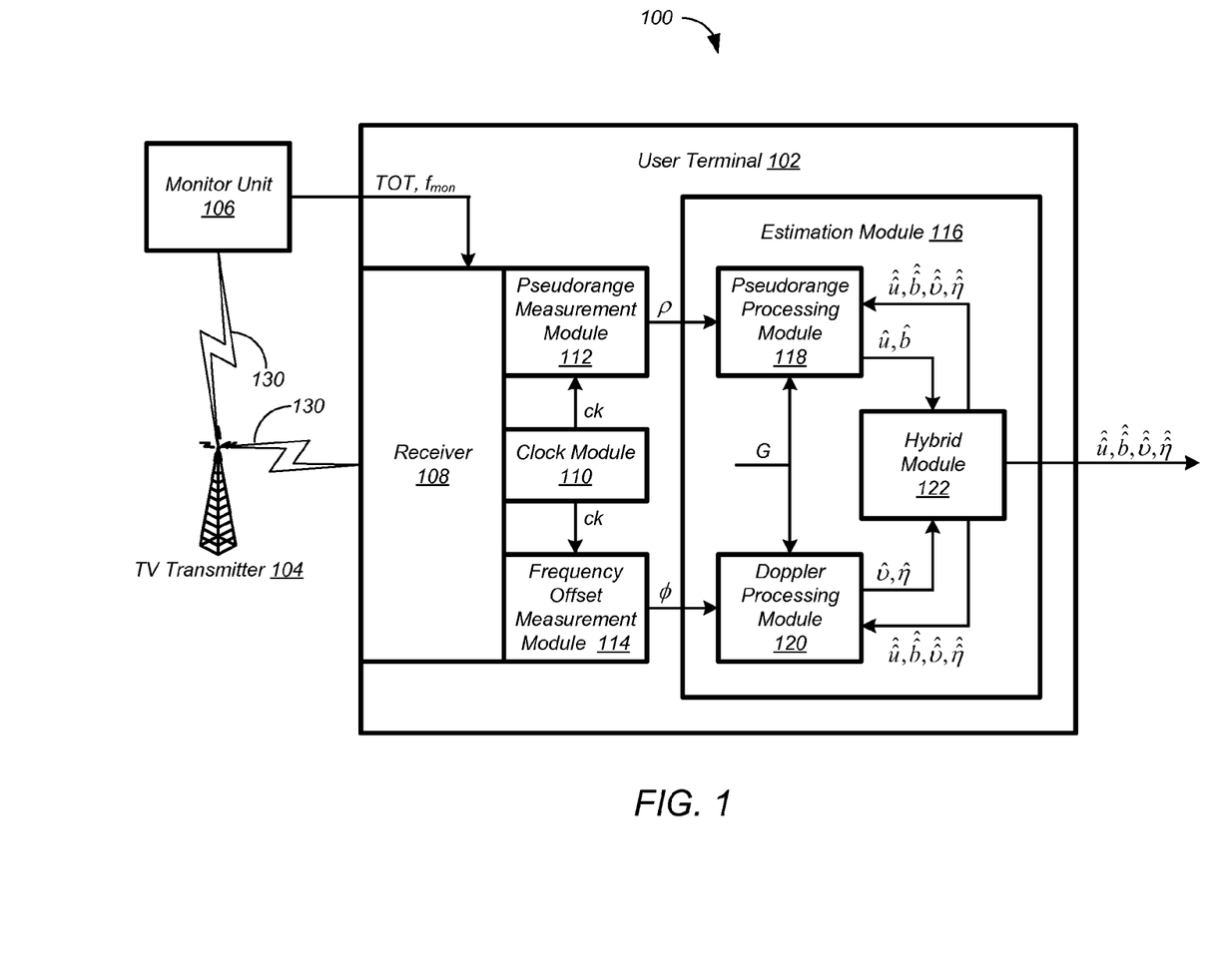
FIG. 1 shows elements of a navigation system according to some embodiments of the present disclosure.

FIG. 1 shows elements of a navigation system 100 according to some embodiments of the present disclosure. Although in the described embodiments, the elements of navigation system 100 are presented in one arrangement, other embodiments may feature other arrangements, as will be apparent to one skilled in the relevant arts based on the disclosure and teachings provided herein. For example, elements of navigation system 100 can be implemented in hardware, software, or combinations thereof.

Referring to FIG. 1, navigation system 100 includes a user device 102, a television (TV) transmitter 104, and a monitor unit 106. In this disclosure, the phrase "user device" is meant to refer to any object capable of implementing the navigation techniques described herein. Examples of user devices include PDAs, mobile phones, cars and other vehicles, and any object which could include a chip or software implementing the navigation techniques described herein. Further, the term "user device" is not intended to be limited to devices which are operated by "users."

Both user device 102 and monitor unit 106 receive wireless television signals 130 transmitted by television transmitter 104. Monitor unit 106 determines times of transmission TOT and frequencies $f_{mon}$ of television signals 130, and reports these measurements to user device 102.

User device 102 includes a receiver configured to receive television signals 130 and measurements TOT and $f_{mon}$. User device 102 also includes a clock module 110 configured to generate a clock signal ck, a pseudorange measurement module 112 configured to determine pseudoranges $\rho$ based on clock signal ck, times of transmission TOT, and television signal 130, a frequency offset measurement module 114 configured to determine frequency offsets $\phi$ of television signal 130 based on clock signal ck and frequencies $f_{user}$ and $f_{mon}$ of television signals 130, and an estimation module 116 configured to determine estimates $\hat{\hat{u}}$, $\hat{\hat{X}}$ $\hat{\hat{gu}}$ of the position and velocity of user device 102, as well as estimates $\hat{\hat{b}}$, $\hat{\hat{X}}$ $\hat{\hat{gh}}$ of the time offset and frequency offset of clock signal ck, based on pseudoranges $\rho$, frequency offsets $\phi$, and geometry matrix G.

Estimation module 116 includes a pseudorange processing module 118 configured to determine interim estimates $\hat{u}, \hat{b}$ of the location of user device 102, and the time offset of clock signal ck, based on pseudoranges $\rho$, geometry matrix G, and estimates $\hat{\hat{u}}$, $\hat{\hat{X}}$ $\hat{\hat{gu}}$ and $\hat{\hat{b}}$, $\hat{\hat{X}}$ $\hat{\hat{gh}}$. Estimation module 116 also includes a Doppler processing module 120 configured to determine interim estimates $\hat{v}, \hat{\eta}$ of the velocity of user device 102, and the frequency offset of clock signal ck, based on frequency offsets $\phi$, geometry matrix G, and estimates $\hat{\hat{u}}$, $\hat{\hat{X}}$ $\hat{\hat{gu}}$ and $\hat{\hat{b}}$, $\hat{\hat{X}}$ $\hat{\hat{gh}}$. Estimation module 116 further includes a hybrid module 122 configured to determine estimates $\hat{\hat{u}}$, $\hat{\hat{X}}$ $\hat{\hat{gu}}$ and $\hat{\hat{b}}$, $\hat{\hat{X}}$ $\hat{\hat{gh}}$ based on interim estimates $\hat{u}, \hat{b}$ and $\hat{v}, \hat{\eta}$. Note that, in this description, estimates generated by hybrid module 122 are denoted by a double hat (for example, $\hat{\hat{u}}$), while interim estimates, which are generated by pseudorange processing module 118 and Doppler processing module 120, are denoted by a single hat (for example, $\hat{u}$).

Figure 2:
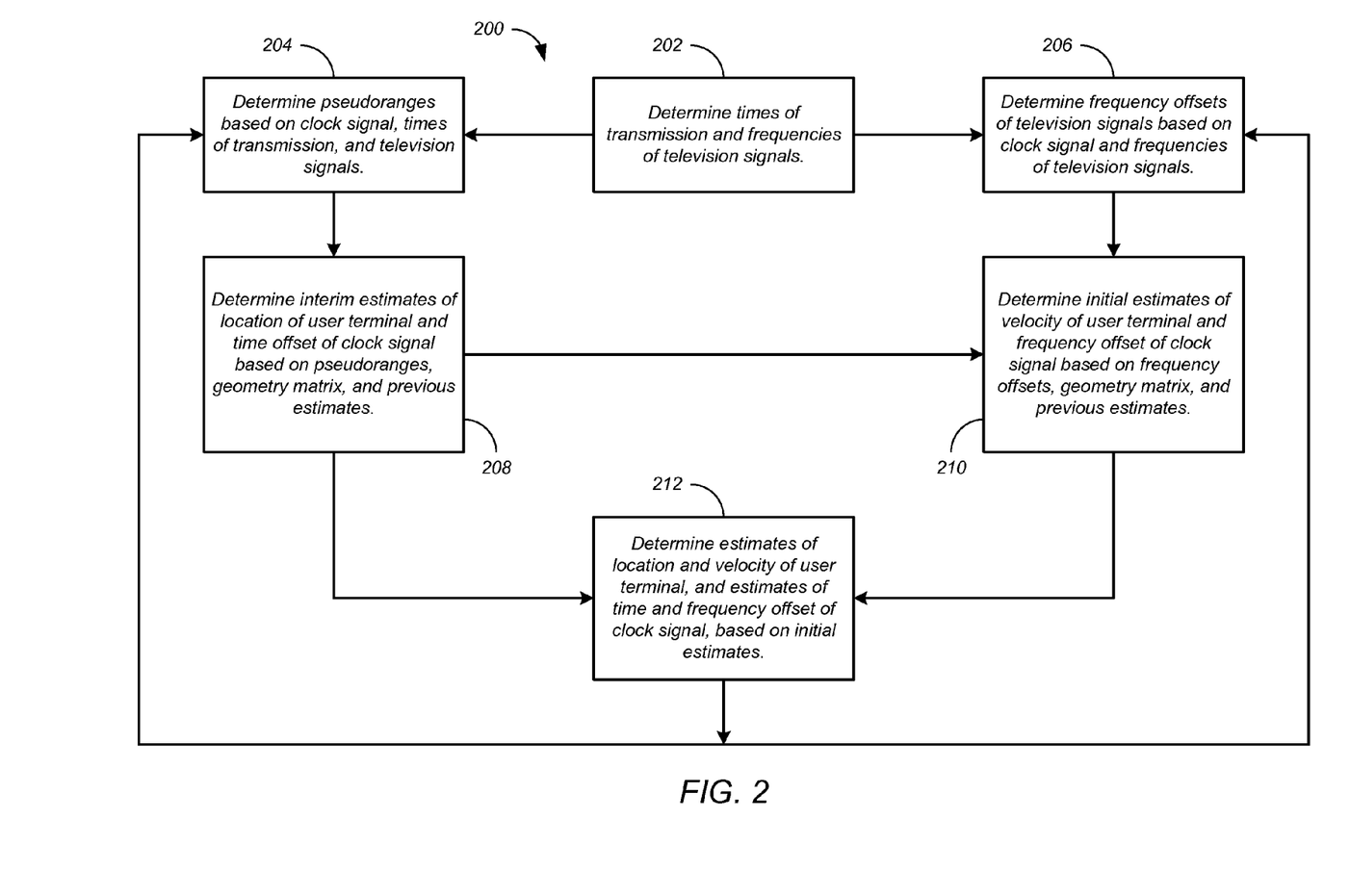
FIG. 2 shows a process for the navigation system of FIG. 1 according to some embodiments of the present disclosure.

FIG. 2 shows a process 200 for navigation system 100 of FIG. 1 according to some embodiments of the present disclosure. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Referring to FIG. 2, at 202, monitor unit 106 determines times of transmission TOT and frequencies $f_{mon}$ of television signal 130, and reports these measurements to user device 102. The use of monitor units is further described in U.S. Pat. No. 7,471,244 issued Dec. 30, 2008, the disclosure thereof incorporated by reference herein in its entirety.

Receiver 108 of user device 102 receives television signals 130 as well. At 204, pseudorange measurement module 112 determines pseudoranges ρ based on clock signal ck, times of transmission TOT, and television signal 130. Determination of pseudoranges based on television signals is further described in the patents cited above.

At 206, frequency offset measurement module 114 determines frequency offsets φ of television signal 130 based on clock signal ck and frequencies $f_{user}$ and $f_{mon}$ of television signals 130. In some embodiments, frequency offsets φ are measured for one or more television pilot signals present in television signal 130. For example, ATSC and NTSC television signals include strong pilots suitable for frequency offset measurements. Other television signals include scattered pilot signals, repeating pilot signals, and the like. In some embodiments, other components of television signal 130 can be used instead of, or in addition to, television pilot signals.

User device 102 can employ multiple television signals 130 from the same or different television transmitters 104. For each television signal 130, if a pseudorange measurement is used, a frequency offset measurement should be used as well. However, if no pseudorange measurement is available for a television signal 130, a frequency offset measurement of that television signal 130 may be used, in conjunction with measurements of pseudorange and frequency offsets from other television signals 130.

At 208, pseudorange processing module 118 determines interim estimates $\hat{u},\hat{b}$ of the location of user device 102, and the time offset of clock signal ck, based on pseudoranges ρ, geometry matrix G, and estimates $\hat{\hat{u}},[|\$]\$\hat{}\$\$[|\$]\$\hat{}\ A\hat{X}[|\$]\$\hat{}\ g\hat{u}$ and $\hat{\hat{b}},[|\$]\$\hat{}\$\$[|\$]\$\hat{}\ A\hat{X}[|\$]\$\hat{}\ g\hat{h}$ from previous operations of hybrid module 122. At 210, Doppler processing module 120 determines interim estimates $\hat{υ},\hat{η}$ of the velocity of user device 102, and the frequency offset of clock signal ck, based on frequency offsets φ, geometry matrix G, and estimates $\hat{\hat{u}},[|\$]\$\hat{}\$\$[|\$]\$\hat{}\ A\hat{X}[|\$]\$\hat{}\ g\hat{u}$ and $\hat{\hat{b}},[|\$]\$\hat{}\$\$[|\$]\$\hat{}\ A\hat{X}[|\$]\$\hat{}\ g\hat{h}$ from previous operations of hybrid module 122. Note that geometry matrix G includes knowledge of the interim estimate $\hat{u}$ of the location of user device 102 determined in step 208. At 212, hybrid module 122 determines estimates $\hat{\hat{u}},[|\$]\$\hat{}\$\$[|\$]\$\hat{}\ A\hat{X}[|\$]\$\hat{}\ g\hat{u}$ and $\hat{\hat{b}},[|\$]\$\hat{}\$\$[|\$]\$\hat{}\ A\hat{X}[|\$]\$\hat{}\ g\hat{h}$ based on interim estimates $\hat{u},\hat{b}$ and $\hat{υ}, \hat{η}$.

Process 200 can repeat as desired, with each set of interim estimates $\hat{u},\hat{b}$ and $\hat{υ},\hat{η}$ determined based on previous estimates $\hat{\hat{u}},[|\$]\$\hat{}\$\$[|\$]\$\hat{}\ A\hat{X}[|\$]\$\hat{}\ g\hat{u}$ and $\hat{b}$, $[|\$]\$\hat{}\$\$[|\$]\$\ A\hat{X}[|\$]\$\hat{}\ g\hat{h}$, thereby increasing the accuracy of the estimates. Monitor unit 106 can repeat the determination of times of transmission TOT and frequencies $f_{mon}$ of television signals 130, and report these measurements to user device 102, as desired.

Embodiments of the disclosure can be implemented in digital electronic circuitry, or in computer hardware, firmware, software, or in combinations of them. Embodiments of the disclosure can be implemented in a computer program product tangibly embodied in a machine-readable storage device for execution by a programmable processor; and method steps of the disclosure can be performed by a programmable processor executing a program of instructions to perform functions of the disclosure by operating on input data and generating output. The disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the disclosure have been described. Nevertheless, it will be understood that various modifications may be made without departing from the spirit and scope of the disclosure. Accordingly, other implementations are within the scope of the following claims.

What is claimed is:

1. An apparatus comprising:
    a clock module configured to generate a clock signal;
    a pseudorange measurement module configured to determine a plurality of first pseudoranges based on the clock signal and a plurality of respective wireless television signals received by an apparatus, wherein each of the first pseudoranges represents a difference between a time of transmission of the respective wireless television signal from a respective transmitter and a time of reception of the respective wireless television signal at the apparatus and a time offset of the clock signal;
    a frequency offset measurement module configured to determine a plurality of first estimates of frequency offsets of the wireless television signals received by the apparatus based on the clock signal;
    an estimation module configured to determine a first estimate of a location of the apparatus based on the first pseudoranges, the first frequency offsets of the wireless television signals, and locations of the transmitters; and
    a receiver module configured to receive indications of times of transmission of the wireless television signals and measurements of the frequencies of the wireless television signals, wherein the measurements of the frequencies of the wireless television signals are determined at one or more monitor units receiving the wireless television signals at known locations;
    wherein the pseudorange measurement module is further configured to determine the plurality of first pseudoranges based on the clock signal, the plurality of respective wireless television signals received by the apparatus, and the times of transmission of the wireless television signals;
    wherein the frequency offset measurement module is further configured to determine the plurality of first estimates of the frequency offsets of the wireless television signals received by the apparatus based on the clock signal and the measurements of the frequencies of the wireless television signals; and wherein the estimation module comprises: a pseudorange processing module configured to determine a first interim estimate of the location of the apparatus, and a first interim estimate of the time offset of the clock signal, based on the first pseudoranges; and a Doppler processing module configured to determine a first interim estimate of the velocity of the apparatus, and a first interim estimate of the frequency offset of the clock signal, based on the first estimates of the frequency offsets of the wireless television signals.

2. The apparatus of claim 1, wherein the estimation module further comprises:

a hybrid module configured to determine the first estimate of the location of the apparatus based on the first interim estimate of the location of the apparatus, the first interim estimate of the time offset of the clock signal, the first interim estimate of the velocity of the apparatus, and the first interim estimate of the frequency offset of the clock signal.

3. The apparatus of claim 2:

wherein the hybrid module is further configured to determine a first estimate of the time offset of the clock signal, a first estimate of the velocity of the apparatus, and a first estimate of a frequency offset of the clock signal based on the first interim estimate of the location of the apparatus, the first interim estimate of the time offset of the clock signal, the first interim estimate of the velocity of the apparatus, and the first interim estimate of the frequency offset of the clock signal.

4. The apparatus of claim 3:

wherein the pseudorange measurement module is further configured to determine a plurality of second pseudoranges based on the wireless television signals received by the apparatus;

wherein the frequency offset measurement module is further configured to determine a plurality of second estimates of the frequency offsets of the wireless television signals received by the apparatus; and wherein the estimation module is further configured to determine a second estimate of the location of the apparatus based on the second pseudoranges, the second estimates of the frequency offsets of the wireless television signals, the locations of the transmitters, the first estimate of the location of the apparatus, the first estimate of the time offset of the clock signal, the first estimate of the velocity of the apparatus, and the first estimate of the frequency offset of the clock signal.

5. The apparatus of claim 4:

wherein the pseudorange processing module is further configured to determine a second interim estimate of the location of the apparatus, and a second interim estimate of the time offset of the clock signal, based on the second pseudoranges, the second estimates of the frequency offsets of the wireless television signals, the locations of the transmitters, the first estimate of the location of the apparatus, the first estimate of the time offset of the clock signal, the first estimate of the velocity of the apparatus, and the first estimate of the frequency offset of the clock signal; and wherein the Doppler processing module is further configured to determine a second interim estimate of the velocity of the apparatus, and a second interim estimate of the frequency offset of the clock signal, based on the second pseudoranges, the second estimates of the frequency offsets of the wireless television signals, the locations of the transmitters, the first estimate of the location of the apparatus, the first estimate of the time offset of the clock signal, the first estimate of the velocity of the apparatus, and the first estimate of the frequency offset of the clock signal.

6. The apparatus of claim 5:

wherein the hybrid module is further configured to determine the second estimate of the location of the apparatus based on the second interim estimate of the location of the apparatus, the second interim estimate of the time offset of the clock signal, the second interim estimate of the velocity of the apparatus, and the second interim estimate of the frequency offset of the clock signal.

7. A method comprising:

determining a plurality of first pseudoranges based on a plurality of respective wireless television signals received by an apparatus and a clock signal generated by the apparatus, wherein each of the first pseudoranges represents a difference between a time of transmission of the respective wireless television signal from a respective transmitter and a time of reception of the respective wireless television signal at the apparatus and a time offset of the clock signal, wherein determining a plurality of first pseudoranges comprises: receiving indications of times of transmission of the wireless television signals, and receiving measurements of frequencies of the wireless television signals, wherein the measurements of the frequencies of the wireless television signals are determined at one or more monitor units receiving the wireless television signals at known locations;

determining a plurality of first estimates of frequency offsets of the wireless television signals received by the apparatus, wherein the first estimates of frequency offsets are based on the clock signal and the measurements of the frequencies of the wireless television signals; and determining a first estimate of a location of the apparatus based on the first pseudoranges, the first frequency offsets of the wireless television signals, and locations of the transmitters, wherein determining a first estimate of a location comprises: determining a first interim estimate of the location of the apparatus based on the first pseudorange, determining a first interim estimate of the time offset of the clock signal based on the first pseudorange, determining a first interim estimate of the velocity of the apparatus based on the first estimate of the frequency offset of the wireless television signal, and determining a first interim estimate of the frequency offset of the clock signal based on the first estimate of the frequency offset of the wireless television signal.

8. The method of claim 7, further comprising:

determining the first estimate of the location of the apparatus based on the first interim estimate of the location of the apparatus, the first interim estimate of the time offset of the clock signal, the first interim estimate of the velocity of the apparatus, and the first interim estimate of the frequency offset of the clock signal.

9. The method of claim 8, further comprising:

determining a first estimate of the time offset of the clock signal, a first estimate of the velocity of the apparatus, and a first estimate of a frequency offset of the clock signal based on the first interim estimate of the location of the apparatus, the first interim estimate of the time offset of the clock signal, the first interim estimate of the velocity of the apparatus, and the first interim estimate of the frequency offset of the clock signal.

10. The method of claim 9, further comprising:

determining a plurality of second pseudoranges based on the wireless television signals received by the apparatus;

determining a plurality of second estimates of the frequency offsets of the wireless television signals received by the apparatus; and determining a second estimate of the location of the apparatus based on the second pseudoranges, the second estimates of the frequency offsets of the wireless television signals, the locations of the transmitters, the first estimate of the location of the apparatus, the first estimate of the time offset of the clock signal, the first estimate of the velocity of the apparatus, and the first estimate of the frequency offset of the clock signal.

11. The method of claim 10, further comprising:

determining a second interim estimate of the location of the apparatus, a second interim estimate of the time offset of the clock signal, a second interim estimate of a velocity of the apparatus, and a second interim estimate of the frequency offset of the clock signal based on the second pseudorange, the second estimate of the frequency offset of the wireless television signal, the location of the transmitter, the first estimate of the location of the apparatus, the first estimate of the time offset of the clock signal, the first estimate of the velocity of the apparatus, and the first estimate of the frequency offset of the clock signal.

12. The method of claim 11, further comprising:

determining the second estimate of the location of the apparatus based on the second interim estimate of the location of the apparatus, the second interim estimate of the time offset of the clock signal, the second interim estimate of the velocity of the apparatus, and the second interim estimate of the frequency offset of the clock signal.

13. Tangible computer-readable media embodying instructions executable by a computer to perform a method comprising:

determining a plurality of first pseudoranges based on a plurality of respective wireless television signals received by an apparatus and a clock signal generated by the apparatus, wherein each of the first pseudoranges represents a difference between a time of transmission of the respective wireless television signal from a respective transmitter and a time of reception of the respective wireless television signal at the apparatus and a time offset of the clock signal, wherein determining a plurality of first pseudoranges comprises: receiving indications of times of transmission of the wireless television signals, and receiving measurements of frequencies of the wireless television signals, wherein the measurements of the frequencies of the wireless television signals are determined at one or more monitor units receiving the wireless television signals at known locations;

determining a plurality of first estimates of frequency offsets of the wireless television signals received by the apparatus, wherein the first estimates of frequency offsets are based on the clock signal and the measurements of the frequencies of the wireless television signals; and determining a first estimate of a location of the apparatus based on the first pseudoranges, the first frequency offsets of the wireless television signals, and locations of the transmitters, wherein determining a first estimate of a location comprises: determining a first interim estimate of the location of the apparatus based on the first pseudorange, determining a first interim estimate of the time offset of the clock signal based on the first pseudorange, determining a first interim estimate of the velocity of the apparatus based on the first estimate of the frequency offset of the wireless television signal, and determining a first interim estimate of the frequency offset of the clock signal based on the first estimate of the frequency offset of the wireless television signal.

14. The tangible computer-readable media of claim 13, wherein the method further comprises:

determining the first estimate of the location of the apparatus based on the first interim estimate of the location of the apparatus, the first interim estimate of the time offset of the clock signal, the first interim estimate of the velocity of the apparatus, and the first interim estimate of the frequency offset of the clock signal.

15. The tangible computer-readable media of claim 14, wherein the method further comprises:

determining a first estimate of the time offset of the clock signal, a first estimate of the velocity of the apparatus, and a first estimate of a frequency offset of the clock signal based on the first interim estimate of the location of the apparatus, the first interim estimate of the time offset of the clock signal, the first interim estimate of the velocity of the apparatus, and the first interim estimate of the frequency offset of the clock signal.

16. The tangible computer-readable media of claim 15, wherein the method further comprises:

determining a plurality of second pseudoranges based on the wireless television signals received by the apparatus;

determining a plurality of second estimates of the frequency offsets of the wireless television signals received by the apparatus; and determining a second estimate of the location of the apparatus based on the second pseudoranges, the second estimates of the frequency offsets of the wireless television signals, the locations of the transmitters, the first estimate of the location of the apparatus, the first estimate of the time offset of the clock signal, the first estimate of the velocity of the apparatus, and the first estimate of the frequency offset of the clock signal.

17. The tangible computer-readable media of claim 16, wherein the method further comprises:

determining a second interim estimate of the location of the apparatus, a second interim estimate of the time offset of the clock signal, a second interim estimate of a velocity of the apparatus, and a second interim estimate of the frequency offset of the clock signal based on the second pseudorange, the second estimate of the frequency offset of the wireless television signal, the location of the transmitter, the first estimate of the location of the apparatus, the first estimate of the time offset of the clock signal, the first estimate of the velocity of the apparatus, and the first estimate of the frequency offset of the clock signal.

18. The tangible computer-readable media of claim 17, wherein the method further comprises:

determining the second estimate of the location of the apparatus based on the second interim estimate of the location of the apparatus, the second interim estimate of the time offset of the clock signal, the second interim estimate of the velocity of the apparatus, and the second interim estimate of the frequency offset of the clock signal.

* * * * *

UNITED STATES PATENT AND TRADEMARK OFFICE
CERTIFICATE OF CORRECTION

PATENT NO. : 8,125,389 B1
APPLICATION NO. : 12/582051
DATED : February 28, 2012
INVENTOR(S) : Guttorm Opshaug et al.

It is certified that error appears in the above-identified patent and that said Letters Patent is hereby corrected as shown below:

In the Specification

Delete the paragraphs beginning at column 10, line 16, and ending at column 10, line 52, and insert

--

User device 102 includes a receiver configured to receive television signals 130 and measurements $TOT$ and $f_{mon}$. User device 102 also includes a clock module 110 configured to generate a clock signal $ck$, a pseudorange measurement module 112 configured to determine pseudoranges $\rho$ based on clock signal $ck$, times of transmission $TOT$, and television signal 130, a frequency offset measurement module 114 configured to determine frequency offsets $\phi$ of television signal 130 based on clock signal $ck$ and frequencies $f_{user}$ and $f_{mon}$ of television signals 130, and an estimation module 116 configured to determine estimates $\hat{u},\hat{v}$ of the position and velocity of user device 102, as well as estimates $\hat{b},\hat{\eta}$ of the time offset and frequency offset of clock signal $ck$, based on pseudoranges $\rho$, frequency offsets $\phi$, and geometry matrix $G$.

Estimation module 116 includes a pseudorange processing module 118 configured to determine interim estimates $\hat{u},\hat{b}$ of the location of user device 102, and the time offset of clock signal $ck$, based on pseudoranges $\rho$, geometry matrix $G$, and estimates $\hat{u},\hat{v}$ and $\hat{b},\hat{\eta}$. Estimation module 116 also includes a Doppler processing module 120 configured to determine interim estimates $\hat{v},\hat{\eta}$ of the velocity of user device 102, and the frequency offset of clock signal $ck$, based on frequency offsets $\phi$, geometry matrix $G$, and estimates $\hat{u},\hat{v}$ and Signed and Sealed this
Twenty-second Day of October, 2013

Teresa Stanek Rea
*Deputy Director of the United States Patent and Trademark Office*

CERTIFICATE OF CORRECTION (continued)
U.S. Pat. No. 8,125,389 B1

$\hat{\hat{b}},\hat{\hat{\eta}}$. Estimation module 116 further includes a hybrid module 122 configured to determine estimates $\hat{\hat{u}},\hat{\hat{v}}$ and $\hat{\hat{b}},\hat{\hat{\eta}}$ based on interim estimates $\hat{u},\hat{b}$ and $\hat{v},\hat{\eta}$. Note that, in this description, estimates generated by hybrid module 122 are denoted by a double hat (for example, $\hat{\hat{u}}$), while interim estimates, which are generated by pseudorange processing module 118 and Doppler processing module 120, are denoted by a single hat (for example, $\hat{u}$). -- therefor.

Delete the paragraphs beginning at column 11, line 27, and ending at column 11, line 54, and insert

--

At 208, pseudorange processing module 118 determines interim estimates $\hat{u},\hat{b}$ of the location of user device 102, and the time offset of clock signal $ck$, based on pseudoranges $\rho$, geometry matrix $G$, and estimates $\hat{\hat{u}},\hat{\hat{v}}$ and $\hat{\hat{b}},\hat{\hat{\eta}}$ from previous operations of hybrid module 122. At 210, Doppler processing module 120 determines interim estimates $\hat{v},\hat{\eta}$ of the velocity of user device 102, and the frequency offset of clock signal $ck$, based on frequency offsets $\phi$, geometry matrix $G$, and estimates $\hat{\hat{u}},\hat{\hat{v}}$ and $\hat{\hat{b}},\hat{\hat{\eta}}$ from previous operations of hybrid module 122. Note that geometry matrix $G$ includes knowledge of the interim estimate $\hat{u}$ of the location of user device 102 determined in step 208. At 212, hybrid module 122 determines estimates $\hat{\hat{u}},\hat{\hat{v}}$ and $\hat{\hat{b}},\hat{\hat{\eta}}$ based on interim estimates $\hat{u},\hat{b}$ and $\hat{v},\hat{\eta}$.

Process 200 can repeat as desired, with each set of interim estimates $\hat{u},\hat{b}$ and $\hat{v},\hat{\eta}$ determined based on previous estimates $\hat{\hat{u}},\hat{\hat{v}}$ and $\hat{\hat{b}},\hat{\hat{\eta}}$, thereby increasing the accuracy of the estimates. Monitor unit 106 can repeat the determination of times of transmission $TOT$ and frequencies $f_{mon}$ of television signals 130, and report these measurements to user device 102, as desired. -- therefor.